(12) United States Patent
Joffe et al.

(10) Patent No.: US 8,001,547 B2
(45) Date of Patent: *Aug. 16, 2011

(54) LOGIC FOR SYNCHRONIZING MULTIPLE TASKS AT MULTIPLE LOCATIONS IN AN INSTRUCTION STREAM

(75) Inventors: Alexander Joffe, Palo Alto, CA (US); Asad Khamisy, Fremont, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 65 days.

This patent is subject to a terminal disclaimer.

(21) Appl. No.: 12/201,385

(22) Filed: Aug. 29, 2008

(65) Prior Publication Data

US 2008/0320485 A1    Dec. 25, 2008

Related U.S. Application Data

(63) Continuation of application No. 10/117,781, filed on Apr. 4, 2002, now Pat. No. 7,421,693.

(51) Int. Cl.
*G06F 9/46* (2006.01)
*G06F 12/00* (2006.01)

(52) U.S. Cl. ........................ 718/104; 710/240
(58) Field of Classification Search ............. 718/104; 710/240

See application file for complete search history.

(56) References Cited

U.S. PATENT DOCUMENTS

| | | | |
|---|---|---|---|
| 3,905,023 A | 9/1975 | Perpiglia | |
| 4,316,245 A | 2/1982 | Luu et al. | |
| 4,395,757 A | 7/1983 | Bienvenu et al. | |
| 5,006,978 A | 4/1991 | Neches | |
| 5,115,449 A | 5/1992 | Lockyer et al. | |
| 5,115,499 A | 5/1992 | Stiffler et al. | |
| 5,161,227 A | 11/1992 | Dias et al. | |
| 5,339,443 A | 8/1994 | Lockwood | |
| 5,408,663 A * | 4/1995 | Miller | 718/104 |
| 5,440,746 A | 8/1995 | Lentz | |
| 5,469,558 A | 11/1995 | Lieberman et al. | |
| 5,506,968 A * | 4/1996 | Dukes | 710/240 |
| 5,515,538 A | 5/1996 | Kleiman | |
| 5,710,933 A * | 1/1998 | Meaney et al. | 718/104 |
| 5,790,851 A * | 8/1998 | Frank et al. | 718/104 |
| 5,790,881 A | 8/1998 | Nguyen | |

(Continued)

OTHER PUBLICATIONS

USPTO Office Action, dated May 4, 2005 in U.S. Appl. No. 10/117,781.

(Continued)

*Primary Examiner* — Emerson C Puente
*Assistant Examiner* — Camquy Truong
(74) *Attorney, Agent, or Firm* — Silicon Valley Patent Group LLP; Omkar Suryadevara

(57) ABSTRACT

Logic (also called "synchronizing logic") in a co-processor (that provides an interface to memory) receives a signal (called a "declaration") from each of a number of tasks, based on an initial determination of one or more paths (also called "code paths") in an instruction stream (e.g. originating from a high-level software program or from low-level microcode) that a task is likely to follow. Once a task (also called "disabled" task) declares its lack of a future need to access a shared data, the synchronizing logic allows that shared data to be accessed by other tasks (also called "needy" tasks) that have indicated their need to access the same. Moreover, the synchronizing logic also allows the shared data to be accessed by the other needy tasks on completion of access of the shared data by a current task (assuming the current task was also a needy task).

27 Claims, 11 Drawing Sheets

U.S. PATENT DOCUMENTS

| | | | |
|---|---|---|---|
| 5,815,399 A * | 9/1998 | Fujibayashi et al. | 700/169 |
| 5,922,057 A | 7/1999 | Holt | |
| 6,065,103 A | 5/2000 | Tran et al. | |
| 6,112,255 A | 8/2000 | Dunn et al. | |
| 6,128,672 A | 10/2000 | Lindsley | |
| 6,173,358 B1 | 1/2001 | Combs | |
| 6,237,019 B1 | 5/2001 | Ault et al. | |
| 6,330,584 B1 | 12/2001 | Joffe et al. | |
| 6,330,626 B1 | 12/2001 | Dennin et al. | |
| 6,338,108 B1 | 1/2002 | Motomura | |
| 6,434,145 B1 | 8/2002 | Opsasnick et al. | |
| 6,549,961 B1 | 4/2003 | Kloth | |
| 6,662,252 B1 | 12/2003 | Marshall et al. | |
| 6,665,755 B2 | 12/2003 | Modelski et al. | |
| 6,912,232 B1 * | 6/2005 | Duffield et al. | 370/468 |
| 6,978,330 B1 | 12/2005 | Joffe et al. | |
| 7,055,151 B1 | 5/2006 | Joffe et al. | |
| 7,155,718 B1 | 12/2006 | Joffe | |
| 7,245,616 B1 | 7/2007 | Elnathan et al. | |
| 2002/0186661 A1 | 12/2002 | Santiago et al. | |
| 2003/0061443 A1 | 3/2003 | Frank et al. | |

OTHER PUBLICATIONS

Response to Office Action, dated Aug. 4, 2005 in U.S. Appl. No. 10/117,781.
USPTO Office Action, dated Oct. 31, 2005 in U.S. Appl. No. 10/117,781.
Request for Continued Examination (RCE) and Response to Office Action, dated Jan. 27, 2006 in U.S. Appl. No. 10/117,781.
USPTO Office Action, dated Apr. 25, 2006 in U.S. Appl. No. 10/117,781.
Response to Office Action, dated Jul. 24, 2006 in U.S. Appl. No. 10/117,781.
USPTO Office Action, dated Oct. 31, 2006 in U.S. Appl. No. 10/117,781.
Response to Office Action, dated Dec. 29, 2006 in U.S. Appl. No. 10/117,781.
USPTO Office Action, dated Jan. 26, 2007 in U.S. Appl. No. 10/117,781.
Response to Office Action, dated Mar. 23, 2007 in U.S. Appl. No. 10/117,781.
Supplemental Response, dated Apr. 30, 2007 in U.S. Appl. No. 10/117,781.
USPTO Notice of Allowance, dated May 9, 2007 in U.S. Appl. No. 10/117,781.
Request for Continued Examination and IDS dated Aug. 1, 2007 in U.S. Appl. No. 10/117,781.
Terminal Disclaimer, dated Sep. 10, 2007 in U.S. Appl. No. 10/117,781.
USPTO Notice of Allowance, dated Sep. 28, 2007 in U.S. Appl. No. 10/117,781.
Request for Continued Examination and IDS dated Dec. 7, 2007 in U.S. Appl. No. 10/117,781.
USPTO Notice of Allowance, dated Apr. 28, 2008 in U.S. Appl. No. 10/117,781.
USPTO Office Action dated Aug. 13, 2004 in U.S. Appl. No. 10/117,780.
Response to Office Action dated Nov. 12, 2004 in U.S. Appl. No. 10/117,780.
USPTO Office Action dated Feb. 6, 2004 in U.S. Appl. No. 10/117,779.
Response to Office Action dated Jun. 1, 2004 in U.S. Appl. No. 10/117,779.
USPTO Office Action dated Aug. 25, 2004 in U.S. Appl. No. 10/117,779.
Response to Office Action dated Dec. 1, 2004 in U.S. Appl. No. 10/117,779.
Notice of Allowance dated Jan. 10, 2005 in U.S. Appl. No. 10/117,779.
Comments on Notice of Allowability dated Apr. 8, 2005 in U.S. Appl. No. 10/117,779.
Office Communication dated Jul. 8, 2005 in U.S. Appl. No. 10/117,779.
Notice of Allowance dated Feb. 9, 2005 in U.S. Appl. No. 10/117,780.
Comments on Statement of Reasons for Allowance dated May 9, 2005 in U.S. Appl. No. 10/117,780.
Entire prosecution history of U.S. Appl. No. 10/117,781, filed Apr. 4, 2002.
Entire prosecution history of U.S. Appl. No. 10/103,436, filed Mar. 20, 2002.
Entire prosecution history of U.S. Appl. No. 10/103,393, filed Mar. 20, 2002.
Entire prosecution history of U.S. Appl. No. 10/103,415, filed Mar. 20, 2002.
Entire prosecution history of U.S. Appl. No. 10/117,394, filed Apr. 4, 2002.
Entire prosecution history of U.S. Appl. No. 10/117,452, filed Apr. 4, 2002.
Entire prosecution history of U.S. Appl. No. 10/117,779, filed Apr. 4, 2002.
Entire prosecution history of U.S. Appl. No. 10/117,780, filed Apr. 4, 2002.

* cited by examiner

|  | Task 0 | Task J | Task M |
|---|---|---|---|
| Request for SA | Enabled | Enabled | Enabled |
| Request for SI | Disabled | Enabled | Enabled |
| Request for SN | Disabled | Disabled | Enabled |

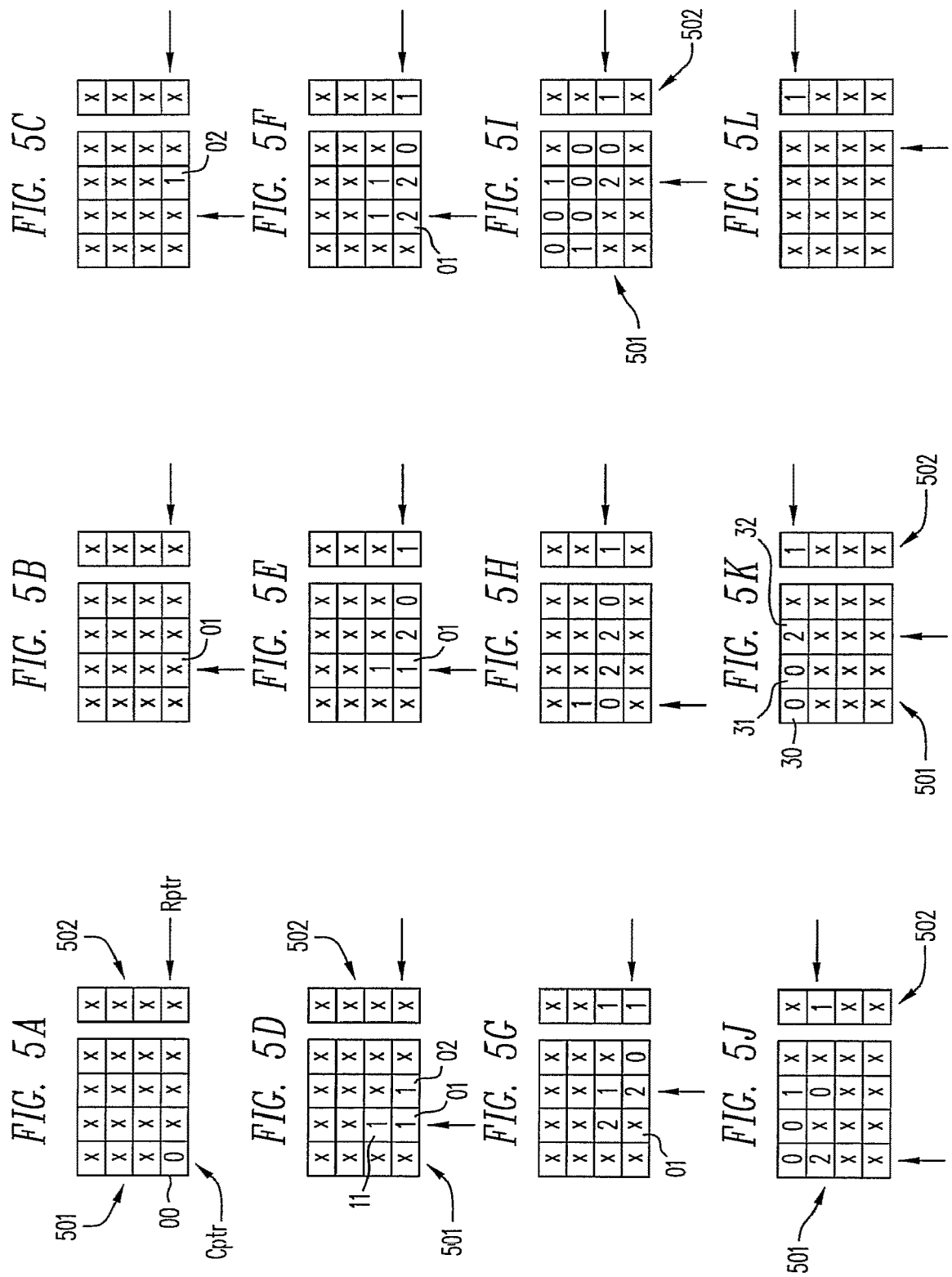

LOGIC FOR SYNCHRONIZING MULTIPLE TASKS AT MULTIPLE LOCATIONS IN AN INSTRUCTION STREAM

CROSS-REFERENCE TO PARENT APPLICATION

This application is a continuation application of U.S. patent application Ser. No. 10/117,781 filed on Apr. 4, 2002, now issued as U.S. Pat. No. 7,421,693 which is incorporated by reference herein in its entirety.

CROSS-REFERENCE TO COMPUTER PROGRAM LISTING APPENDIX

Note that a computer program listing Appendix A originally filed in U.S. patent application Ser. No. 10/117,781 (see above) is hereby expressly incorporated by reference herein in its entirety.

Appendix A contains the following two files in IBM-PC format and compatible with MS-Windows which form a part of the present disclosure and this appendix A is incorporated by reference herein in its entirety:

| Date | Time | Size | File Name |
| --- | --- | --- | --- |
| Mar. 28, 2002 | 02:31p | 365,686 | MEMCOP.TXT |
| Mar. 28, 2002 | 02:33p | 219,262 | UCEXEC.TXT |

The two files of Appendix A form source code of computer programs and related data of an illustrative embodiment of the present invention, as follows:

UCEXEC.TXT file describes the behavioral model of circuitry in a microcontroller's execution unit to decode and execute an instruction to provide a store-and-load command to a memory co-processor; and MEMCOP.TXT file describes the behavioral model of circuitry of the memory co-processor, which is also known as a special processing unit (SPU).

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS REFERENCE TO RELATED APPLICATIONS

This application is related to and incorporates by reference herein in their entirety the following U.S. patent application(s):

(U.S. patent application Ser. No. 10/103,436) entitled "Dynamic Allocation of Packets to Tasks," Nathan Elnathan et al., filed on Mar. 20, 2002, issued as U.S. Pat. No. 7,245,616;

U.S. patent application Ser. No. 10/103,393 entitled "Reordering of Out-of-Order Packets," Nathan Elnathan, filed on Mar. 20, 2002, issued as U.S. Pat. No. 7,072,342;

U.S. patent application Ser. No. 10/103,415 entitled "Asymmetric Coherency Protection," Ilan Pardo, filed on Mar. 20, 2002 now issued as U.S. Pat. No. 7,424,496;

U.S. patent application Ser. No. 10/117,394 entitled "Method and Apparatus to Suspend and Resume on Next Instruction for a Microcontroller," Alexander Joffe, filed on Apr. 4, 2002, issued as U.S. Pat. No. 7,155,718;

U.S. patent application Ser. No. 10/117,452 entitled "Method And Apparatus For Issuing A Command To Store An Instruction And Load Resultant Data In A Microcontroller," Alexander Joffe et al., filed on Apr. 4, 2002 now abandoned (see its divisional U.S. Pat. No. 7,437,535);

U.S. patent application Ser. No. 10/117,779 entitled "Memory Co-Processor for a Multi-Tasking System," Alexander Joffe et al., filed on Apr. 4, 2002, issued as U.S. Pat. No. 6,938,132; and U.S. patent application Ser. No. 10/117,780 entitled "Sequencing Semaphore," Alexander Joffe et al., filed on Apr. 4, 2002, issued as U.S. Pat. No. 6,978,330.

BACKGROUND OF THE INVENTION

A number of tasks executing in a microcontroller 20 (see FIGS. 1A and 1B) may take different paths (also called "code paths") even if such tasks execute the same software program (also called "code") 10. For example, Task0 may make a jump in executing code 10 after performing a first policing function at a location S0, thereby to define a first code path 11. Once Task0 makes the jump, Task0 does not need to perform the remaining policing functions S1 and S2 that are otherwise required during in-line (i.e. no jump) execution of software program 10.

In the example of FIG. 1A, another task, namely Task1 does not jump immediately after location S0 in software program 10, and instead continues with in-line execution (e.g. executes a number of instructions immediately following location S0). However, Task1 may eventually make a jump after performing a second policing function at a location S1 in the software program 10, thereby to define code path 12. In a similar manner, Task2 may simply execute software program 10 without making any jumps immediately after locations S0 and S1, thereby to define code path 13.

In the example being discussed, at various locations in the respective code paths, a decision to make a jump depends on the value of data that is shared among such tasks, Task0-Task2. For example, in a networking application, the policing functions performed at locations S0 and S1 may require that a packet that is being processed be dropped, for example if the rate exceeds a predefined bandwidth allocated to a channel to which the packet belongs.

Therefore, it is important for such tasks, Task0-Task2 to ensure that the data being used in the policing functions is accurate and updated properly. Access to such data may be arbitrated by use of a semaphore as a synchronization mechanism, to access a common location in memory, to ensure that data at that common location is not changed by one task while that data is being used by another task. Use of such a semaphore ensures, for example, that a packet counter is properly incremented (or a database entry is properly accessed) by each of a number of tasks that execute concurrently or simultaneously in the microcontroller.

In using a semaphore, when one task, e.g. Task0 in FIG. 1B, is accessing a memory location at a location S0 in the code, other tasks, e.g. Task1, Task2, and Task3, that also need to access that same memory location are suspended (i.e. are made to wait). While such other tasks are waiting, Task0 may be activated from sleep, may issue a read request on being awakened, may again be put to sleep while waiting for a response from memory, may again be awakened on receiving the memory response, perform a read operation, and finally release the semaphore. Only at this point is the semaphore for code location S0 available for use by the next task, Task1.

Therefore, use of a semaphore effectively single threads the access to a common memory location in all of the tasks, even though a microcontroller (such as a network processor) may support multitasking. Such single threading causes the latency of each task to affect all subsequently-performed tasks.

U.S. Pat. No. 5,790,881 granted to Nguyen on Aug. 4, 1998 entitled "Computer system including coprocessor devices simulating memory interfaces" suggests (see abstract) "coupling a coprocessor to a master device, in which the coprocessor emulates an memory interface to the master device, like that of a memory device . . . . The coprocessor is disposed to receive data written from the master device, perform a coprocessing function on that data, and respond to a read data command from the master device with processing results."

See also U.S. Pat. No. 6,338,108 granted to Motomura on Jan. 8, 2002 entitled "Coprocessor-integrated packet-type memory LSI, packet-type memory/coprocessor bus, and control method thereof" which states (see abstract) that "[a] memory section and coprocessor sections in a coprocessor-integrated packet-type DRAM are provided with unique memory device ID and coprocessor device IDs respectively . . . "

SUMMARY

The present invention relates to logic (also called "synchronizing logic") that receives a signal (called a "declaration") from each of a number of tasks, based on an initial determination of one or more paths (also called "code paths") in an instruction stream (e.g. originating from a high-level software program or from low-level microcode) that a task is likely to follow. An initial determination by a task may be based on any information available prior to generation of the initial signal, including, for example, information in a header (of a packet or a cell) in the case of a networking application (wherein each task processes a packet/cell).

In some embodiments, each of the declarations identifies, for each of a number of predefined locations in a software program (e.g. one or more of locations S0-S2 in FIGS. 1A and 1B), whether or not that task expects to access data (also called "shared data") that is also to be accessed by other tasks (e.g. on executing the same instructions in the instruction stream).

A task that indicates in the declaration a likely future need to access a shared data may decide at a later time that access to that shared data is no longer needed, and may indicate this to the synchronizing logic (via another declaration). However, in some embodiments, the opposite is not permitted, i.e. a task that has previously declared no need to access a shared data cannot change its no-need decision (e.g. due to changed circumstances), to declare that it now needs to access that shared data.

Once a task (also called "no-need" task) declares its lack of a future need to access a shared data (regardless of whether this happens in a first synchronization request or in a subsequent synchronization request), the synchronizing logic allows that shared data to be accessed by other tasks (also called "needy" tasks) that have indicated their need to access the same. Moreover, the synchronizing logic also allows the shared data to be accessed by the other needy tasks on completion of access of the shared data by a current task (assuming the current task was also a needy task).

In some embodiments, commands (such as a "store and load" command) to access the shared data from needy tasks are handled in order (so that allowing a no-need task to change its decision may result in out-of-order processing of access requests, which defeats the premise of in-order processing). In several such embodiments, each task is assigned a sequence number depending on the order in which the data being processed therein (e.g. a packet or a cell) is received, relative to the other tasks. Therefore, the synchronizing logic grants access to the shared data, based on the sequence number (and for this reason such a synchronizing logic is hereinafter called a "synchronizing sequencer").

Such a synchronizing logic may be implemented in either hardware or in a microprocessor programmed with software in different embodiments.

BRIEF DESCRIPTION OF THE DRAWINGS

FIGS. 5A-5L illustrate exemplary transitions that occur in a synchronization request array of the type illustrated in FIG. 2B.

DETAILED DESCRIPTION

Figures 2A, 2B:
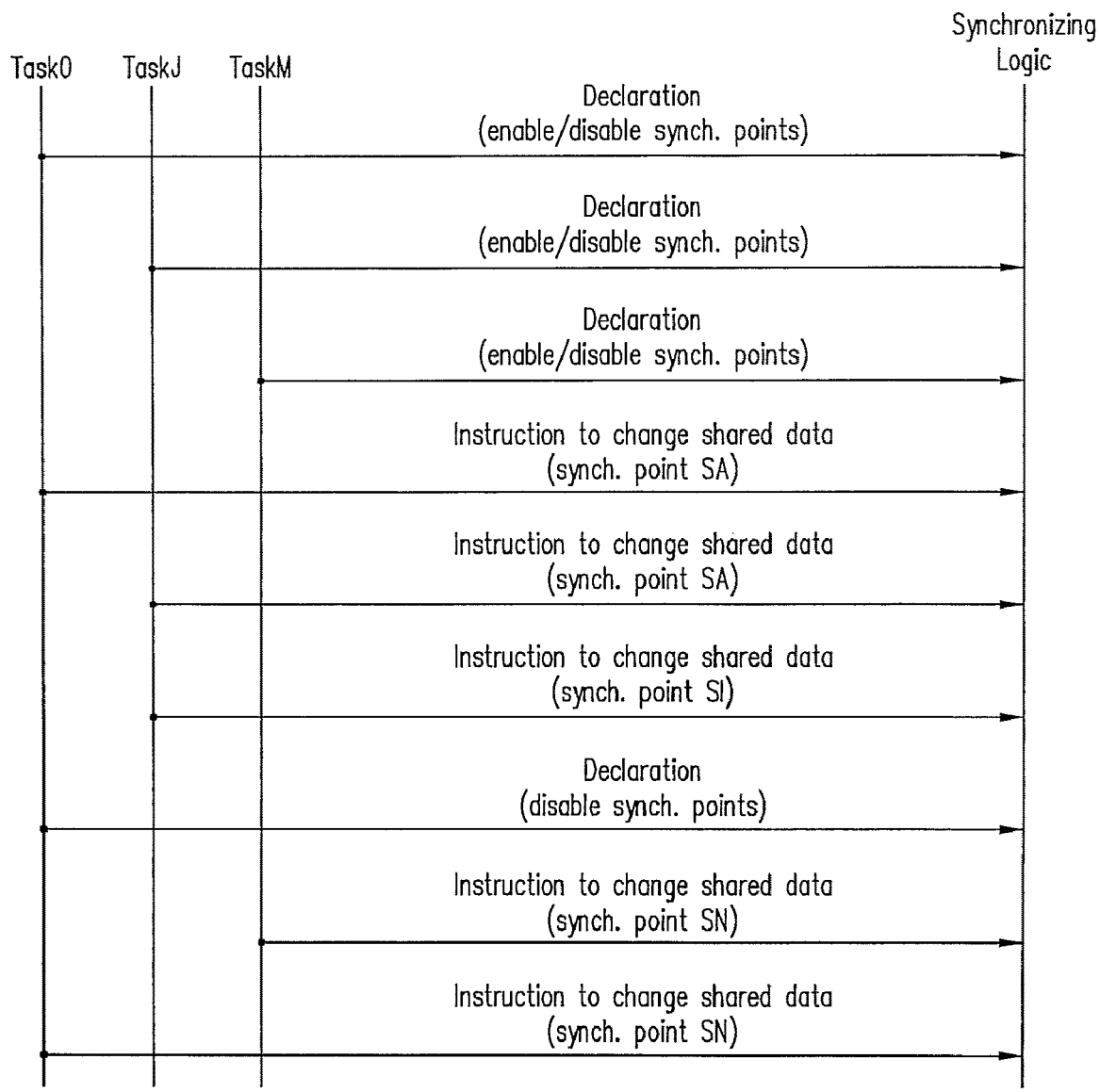
FIG. 2A illustrates each task issuing a "declaration" signal in accordance with the invention, to a synchronizing logic, followed by issuance of instructions to change shared data.
FIG. 2B illustrates a table of states maintained in accordance with the invention for use in providing access to shared data.

In accordance with the invention, on startup or a short time thereafter prior to accessing any shared data, a number of tasks Task0-TaskM (wherein $0 \leq J \leq M$, M being the total number of tasks) issue signals (called "declarations") to a logic (called "synchronizing logic") as illustrated in FIG. 2A, to identify whether or not the tasks expect to access shared resources at certain predefined synchronization points SA-SN (wherein $A \leq I \leq N$, N being the total number of synchronization points) in their instruction streams. If access to a shared resource is expected at a synchronization point SA, then this synchronization point SA is indicated as having a state "enabled" and otherwise indicated as having the state "disabled."

The synchronizing logic receives such state signals from each task "TaskJ", for each synchronization point SI, and stores the state locally in a buffer (e.g. in a two-dimensional table as illustrated in FIG. 2B). The synchronizing logic uses the states in deciding whether or not to allow an instruction from a task to access the shared data. When an instruction affecting a shared resource is received from a task for any specific synchronization point SI, the synchronizing logic changes a state associated with the task from "enabled" to "pending."

If a task's state is "pending" and if it is now this task's turn, then the synchronizing logic issues any instructions from this task (such as a read-modify-write instruction) to the execution unit. Specifically, the synchronizing logic maintains a current pointer for each synchronization point SI, and this current pointer indicates which task's instruction (for accessing shared data) is to be now executed.

If the current pointer points to a task that has not yet provided an instruction and if the task is "enabled" then any instructions from other tasks that are received are made to wait until the current task's instruction is received and executed. If a task does not expect to issue such an instruction (and the state is "disabled"), then the current pointer is incremented to identify the next task that is current for this synchronization point SI.

Therefore, if a number of tasks do not expect to access a particular resource, then these tasks are assigned the state "disabled". In providing access to that particular resource, all disabled tasks are skipped over, thereby to speed up the arbitration. The tasks just described as being "disabled" may expect to access one or more other shared resources, and indicate this need in their respective declarations.

If an instruction is received from a task "TaskJ" for a specific synchronization point SI, and if the current pointer for this synchronization point SI is pointing to TaskJ, then that instruction is immediately executed.

Moreover, in some embodiments, the current pointer is incremented (or increased) to point to the next task from which an instruction is to be executed.

In certain embodiments, the increment (or increase) is unconditional (i.e. automatic), and alternatively in other embodiments the increment (or increase) depends on a specific signal from the task. The just-described signal (also called "lock current pointer" signal) may be activated by a task, to allow any number of instructions from the task to be executed for the current synchronization point SJ, prior to execution of an instruction from another task.

Use of such "lock current pointer" signal (and a version of this signal is called "update sequence number" signal) implements a critical section of any length while the signal is active, thereby causing the synchronizing logic to act as a semaphore of the type described in detail in a related U.S. patent application Ser. No. 10/117,780 that has been incorporated by reference above.

Increment of the current pointer described above may be optimized in some embodiments to be sufficiently large to skip over all tasks that do not expect to provide any instructions for accessing or changing the shared data for this synchronization point SI. In several embodiments, operation of a current pointer and allocation of a shared resource at one synchronization point SI is independent of the corresponding operation and allocation at another synchronization point SJ. Therefore, there may be no sequence relation between, for example, two policing operations (which may be used to control the flow of packets in a network, for example). For this reason the two policing operations may be identified as two synchronization points SI and SJ.

Figure 3A:
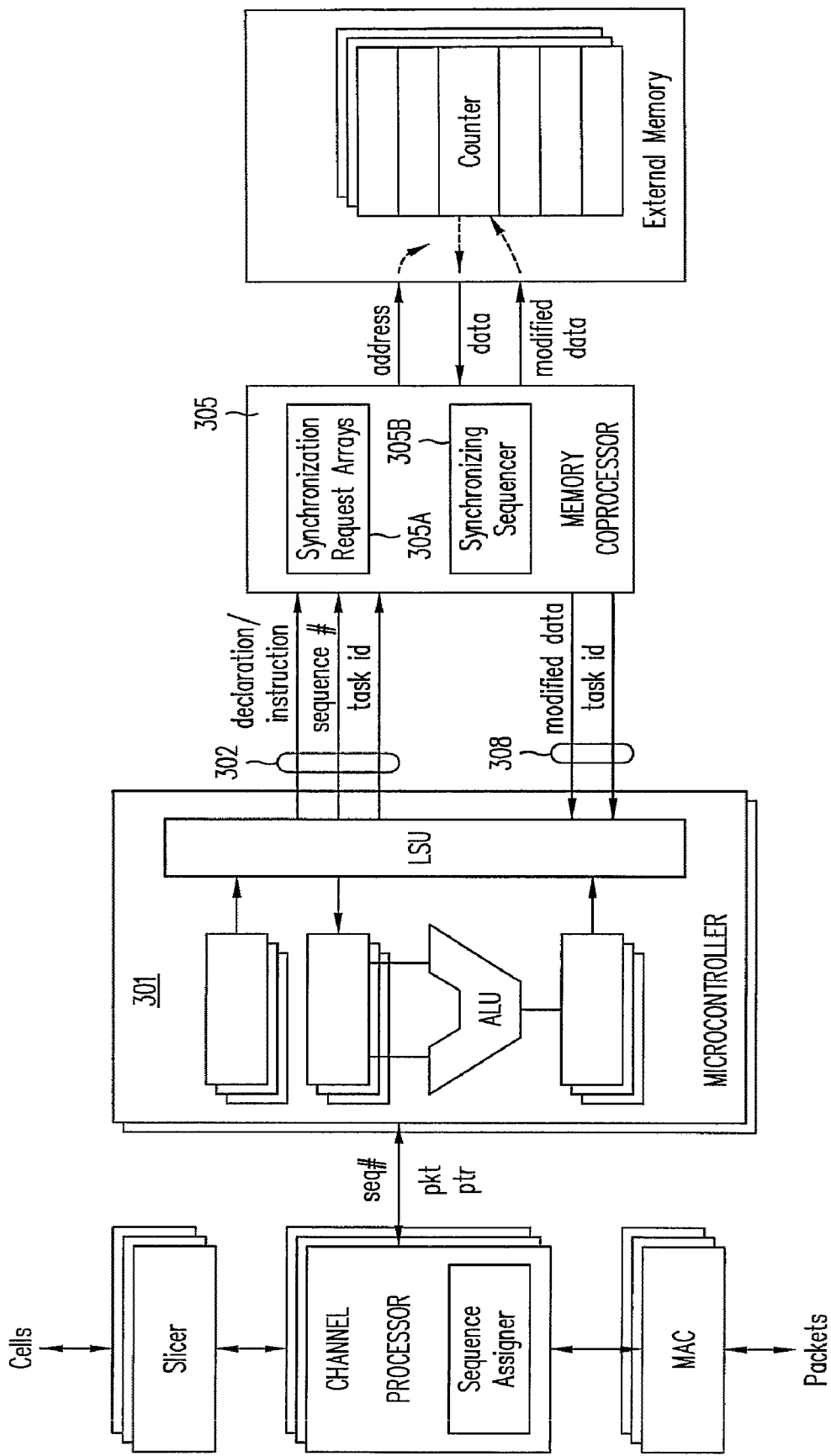
FIG. 3A illustrates, in a block diagram, use of a memory co-processor to interface a microcontroller to external memory, in accordance with the invention.

In one specific embodiment, the synchronizing logic selectively provides access to a number of shared data (e.g. eight shared data) among multiple tasks that execute in a microcontroller 301 (FIG. 3A), such as a network processor. Microcontroller 301 is coupled to and controls the operation of one or more channel processors that process packets and/or cells, as described in, for example, U.S. Pat. No. 6,330,584 granted to Joffe that is incorporated by reference herein in its entirety. Each of the channel processors assigns a sequence number to each packet according to their order of arrival, and the sequence number along with a pointer to the packet is supplied to microcontroller 301.

The sequence number that is assigned to each packet may be any monotonically changing number (e.g. a number that is incremented or decremented by 1 for each packet arrival), and depending on the embodiment the sequence number is unique globally across all channel processors or alternatively the sequence number is unique only within a channel processor (or only in one direction of one channel processor).

On receipt of a packet pointer and its associated sequence number, microcontroller 301 assigns the packet to a task executing therein (an assignment may be performed by, for example, a request unit). The task generates a declaration followed by one or more instructions to the co-processor, to change shared data in memory. The just-described signals generated by a task are handled by a synchronizing logic which is hereinafter referred to as a synchronizing sequencer, by virtue of its use of sequence numbers in deciding the order of access.

A synchronizing sequencer of the type described herein can be implemented off-chip, i.e. outside of microcontroller 301 in which various tasks are executing. In one such embodiment illustrated in FIG. 3A, a synchronizing sequencer 305B is implemented in hardware in a separate co-processor 305 that is used in one embodiment to access external memory (as described in, for example, U.S. patent application Ser. No. 10/117,779 concurrently filed herewith and incorporated by reference above).

Memory co-processor 305 includes, in addition to synchronizing sequencer 305B, a number of buffers 305A in which are stored tables 305A (of the type described above; also called "synchronization request arrays"). There is one table among tables 305A for each synchronization point S0-SN. As noted above, multiple tables 305A identify the state of access of shared data by various tasks (which in this example are identified by sequence numbers, because each task is assigned to a sequence number and works on a packet of that sequence number).

Each table 305A holds the state of a group of (e.g. all) sequence numbers that identify which one of the tasks currently needs to supply a command to memory co-processor 305. When a task has either indicated no need to access the shared data or the task's instruction (such as a read-modify-write instruction) to change the shared data has been executed, the sequence number is incremented (assuming the "update sequence number" signal is enabled with the read-modify-write instruction), after setting the synchronization point's state for the current sequence number (prior to incrementing) to "invalid".

Figure 1A:
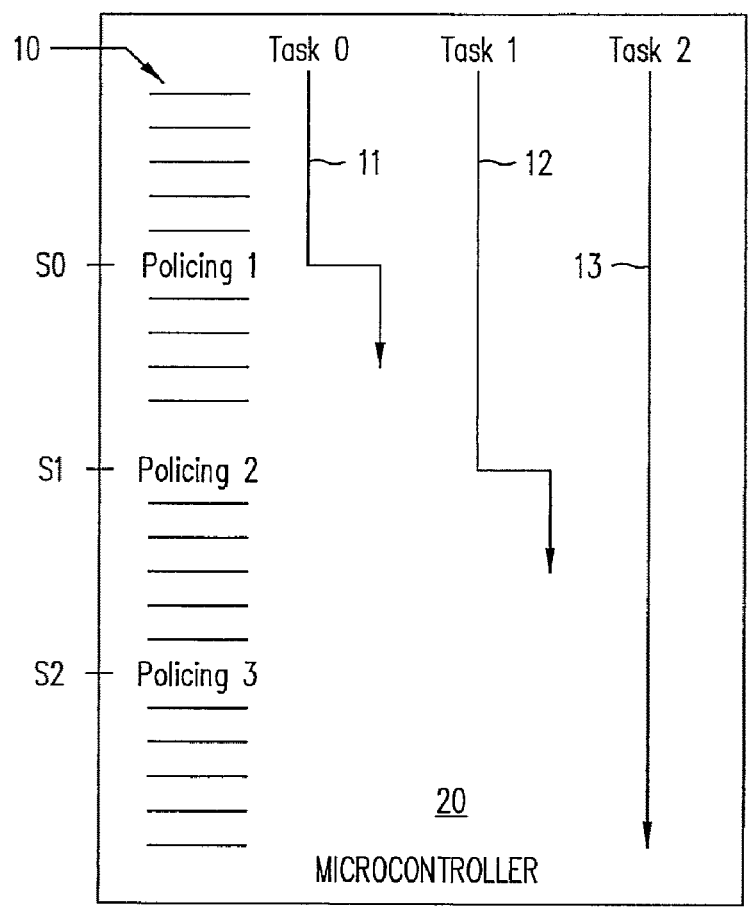
FIGS. 1A and 1B illustrate code paths of tasks in the prior art, wherein the tasks need to synchronize their access to shared data at various synchronization points.
Figure 1B:
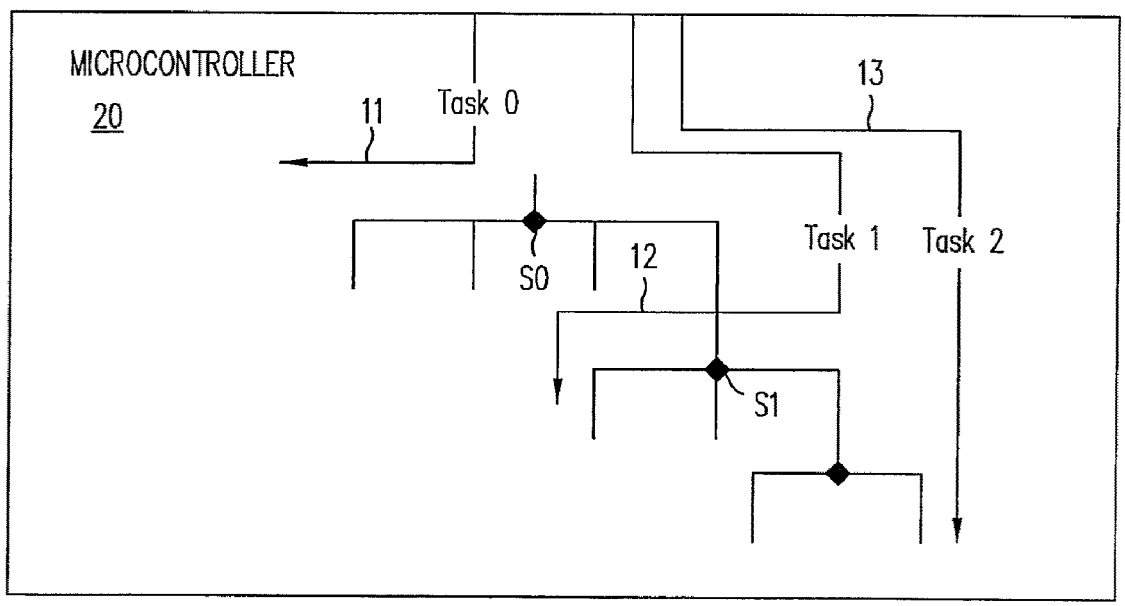
Figure 3B:
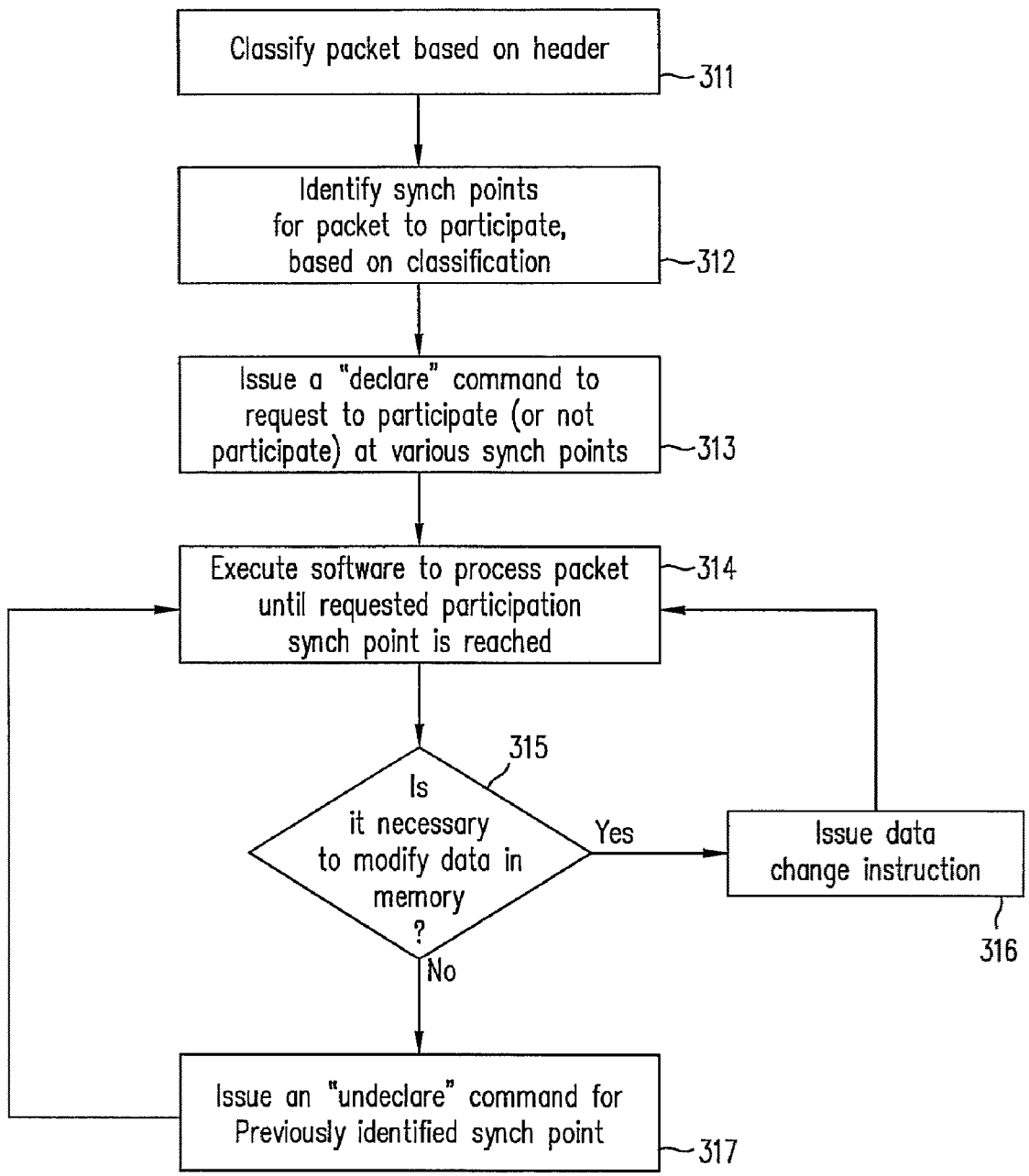
FIG. 3B illustrates, in a flow chart, acts performed by a task in a microcontroller for accessing shared data in one embodiment.

Soon after startup, each task compares one or more items of information in its packet header to predetermined values, thereby to classify the packet (see act 311 in FIG. 3B). Next, the task identifies (see act 312) synchronization points at which processing of the packet is likely to access data shared with other tasks, e.g. at points S0, S1 and S2 illustrated in FIGS. 1A and 1B. For any given software program, synchronization points are known ahead of time, based on packet type.

Next, the task issues (see act 313 in FIG. 3B) a "declare" command to a synchronizing sequencer. In some embodiments, each "declare" command identifies, in addition to predefined synchronization points, an identifier of the task that processes the packet (as per FIG. 3C; also see bus 302 in FIG. 3A).

After issuing a declare command, each task simply continues, e.g. executes software to process the packet (see act 314 in FIG. 3B), until a synchronization point is reached. When a synchronization point is reached, each task-goes to act 315 (FIG. 3B) to check if it is necessary to modify the shared data in memory. Under normal circumstances, this is true, and therefore the task goes to act 316 to issue an instruction to change the data (e.g. increment a packet counter). Alternatively, the task may go to act 317 (from act 315), e.g. if on performance of a policing function it is decided to drop the packet being processed. If so, the task indicates its change in expectation, about not needing to use shared data at one or more synchronization points that were previously marked "enabled".

A synchronizing sequencer receives each instruction issued by each task, and uses a buffer (of the type described above in reference to FIG. 2B) to determine the action to be taken. For example, synchronizing sequencer temporarily stores each instruction in a buffer (also referred to as an "out of sequence" buffer), unless the following two conditions are met: (1) the task is currently enabled to access the shared data for this synchronization point and (2) it is now the current task's turn (as noted above in reference to FIG. 2B) to access the shared data.

Figure 3C:
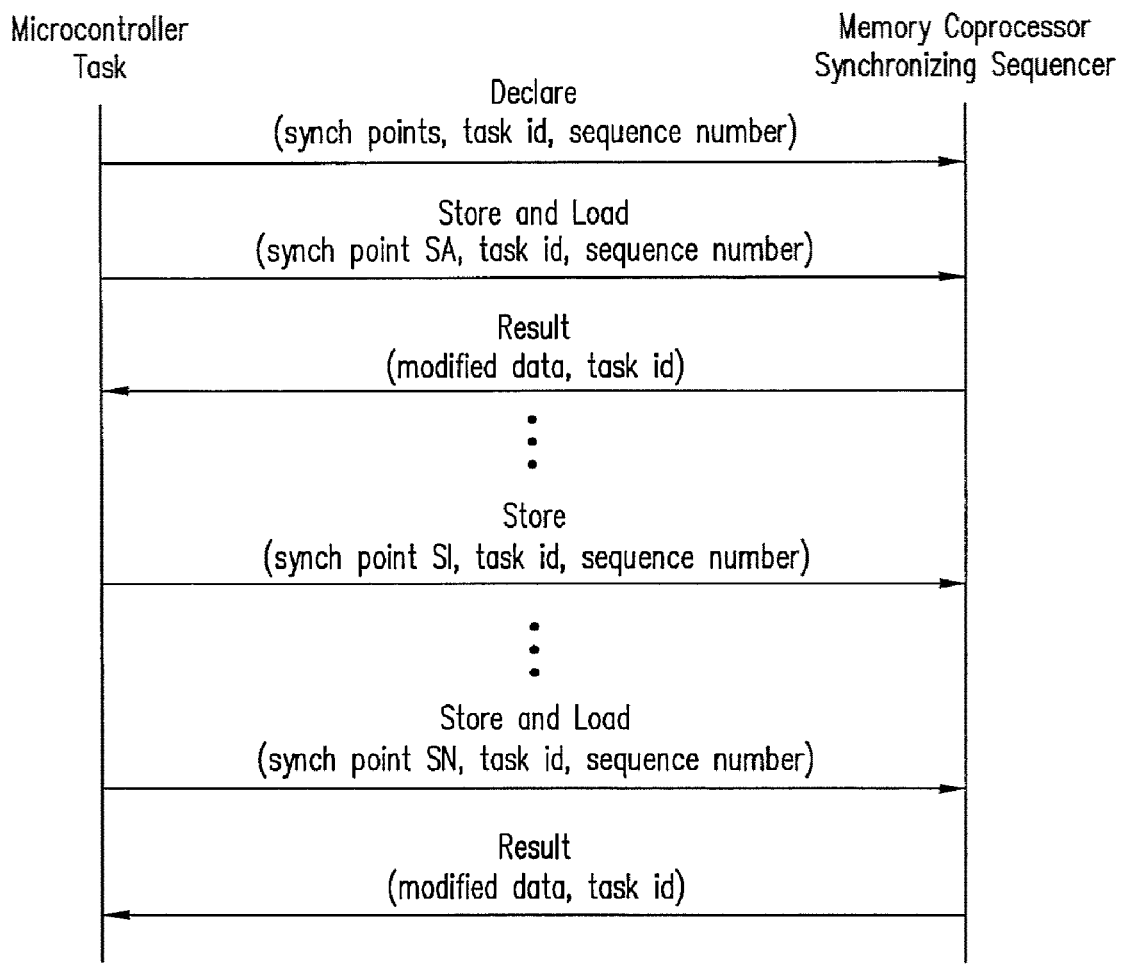
FIG. 3C illustrates, in a timing chart, a sequence of events when a task accesses shared data at a specific location in one embodiment.

In one example, the signals exchanged between a microcontroller-based task and coprocessor-based synchronizing sequencer are illustrated in FIG. 3C. Specifically, in this example, a task first assembles and issues a declare command for each of a number of synchronization points that it expects to encounter when processing the just-received packet. Thereafter, the task assembles and issues a command to change shared data at a first synchronization point SA.

The issued command may be, for example, a "store-and-load" command (of the type discussed in the related U.S. patent application Ser. No. 10/980,141 incorporated by reference above), and if so, the memory co-processor returns a result to the microcontroller, indicating, for example, the task that issued the command and optionally a register in which the result is to be stored. Any number of such store-and-load commands or alternatively store commands may be issued by the task, based on synchronization points SA-SN identified in the declaration.

Figure 4A:
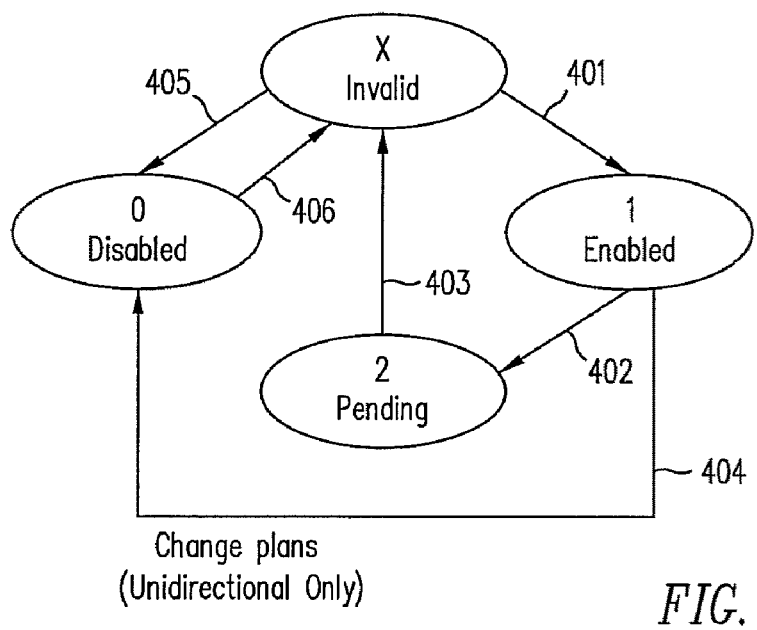
FIG. 4A illustrates, in a state diagram, transitions between various states of each task in accessing shared data in one embodiment.

On receipt of a declare command identifying a particular synchronization point S1 as being "enabled", the synchronizing sequencer changes a value in the above-described table from "invalid" (which is a default value) to "enabled", as illustrated by branch 401 (FIG. 4A). Thereafter, when the synchronizing sequencer receives a store-and-load (or store) command, the synchronizing sequencer changes an "enabled" value in the table to "pending" (as illustrated by branch 402). When a task's command has been executed, the synchronizing sequencer changes a "pending" value in the table to "invalid" (as illustrated by branch 403).

When a task indicates its change in expectation, about not needing to use shared data at one or more synchronization points that were previously at the state "enabled", the synchronizing sequencer changes an "enabled" state in the table to "disabled" (as illustrated by branch 404). Branch 404 is only a unidirectional branch, meaning that a state "disabled" is not to be changed to "enabled". A task may also indicate at the inception that it does not expect to participate in changing data at a specific synchronization point, and in this case, the synchronizing sequencer changes an "invalid" state in the table to "disabled" (as illustrated by branch 405).

The synchronizing sequencer changes a "disabled" state in the table to "invalid" (as illustrated by branch 406) when incrementing a current pointer (beyond the sequence number for the current task). The synchronizing sequencer never changes an "enabled" state in the table to "invalid".

Figure 4B:
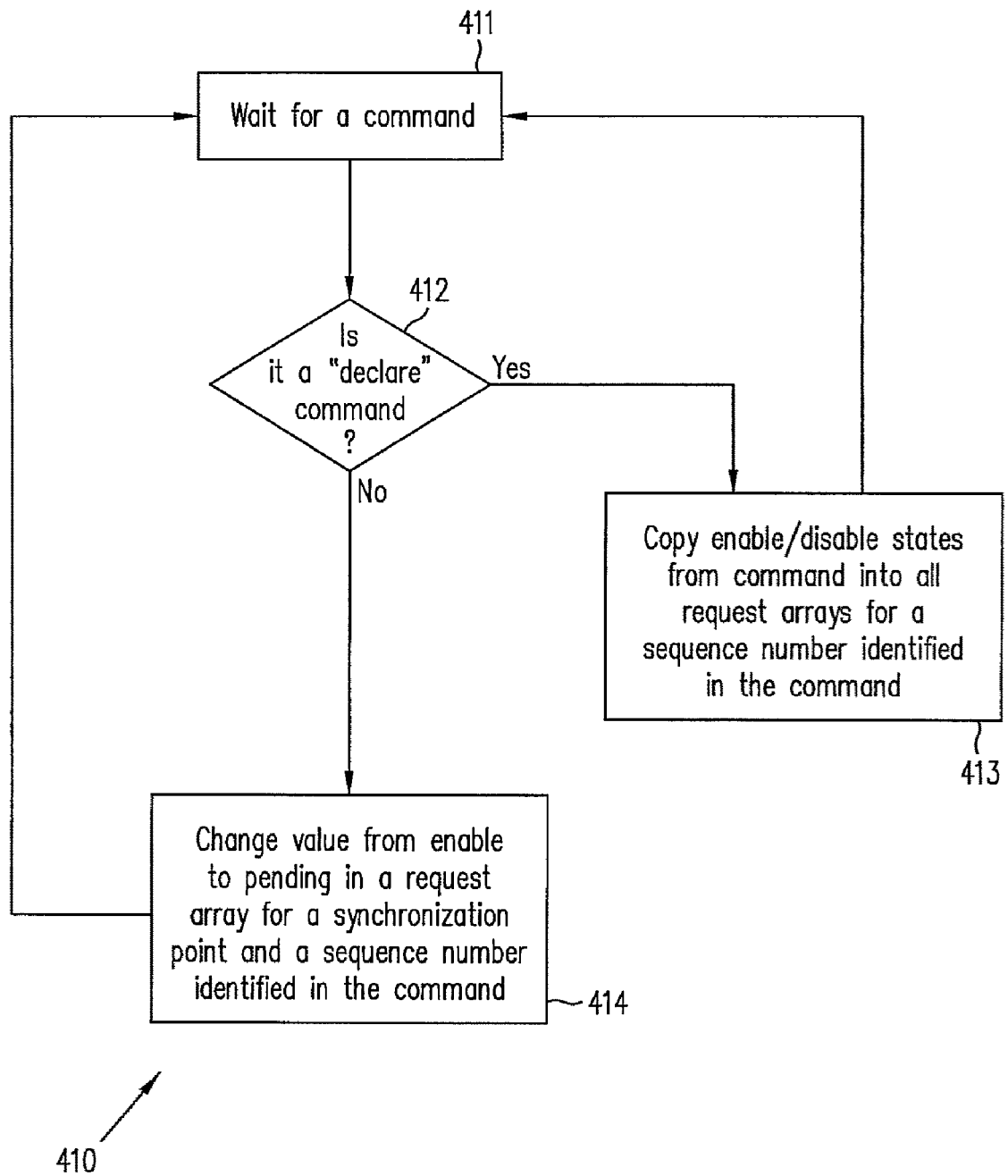
FIGS. 4B and 4C illustrate, in flow charts, acts performed by a synchronizing sequencer of one embodiment.
Figure 4C:
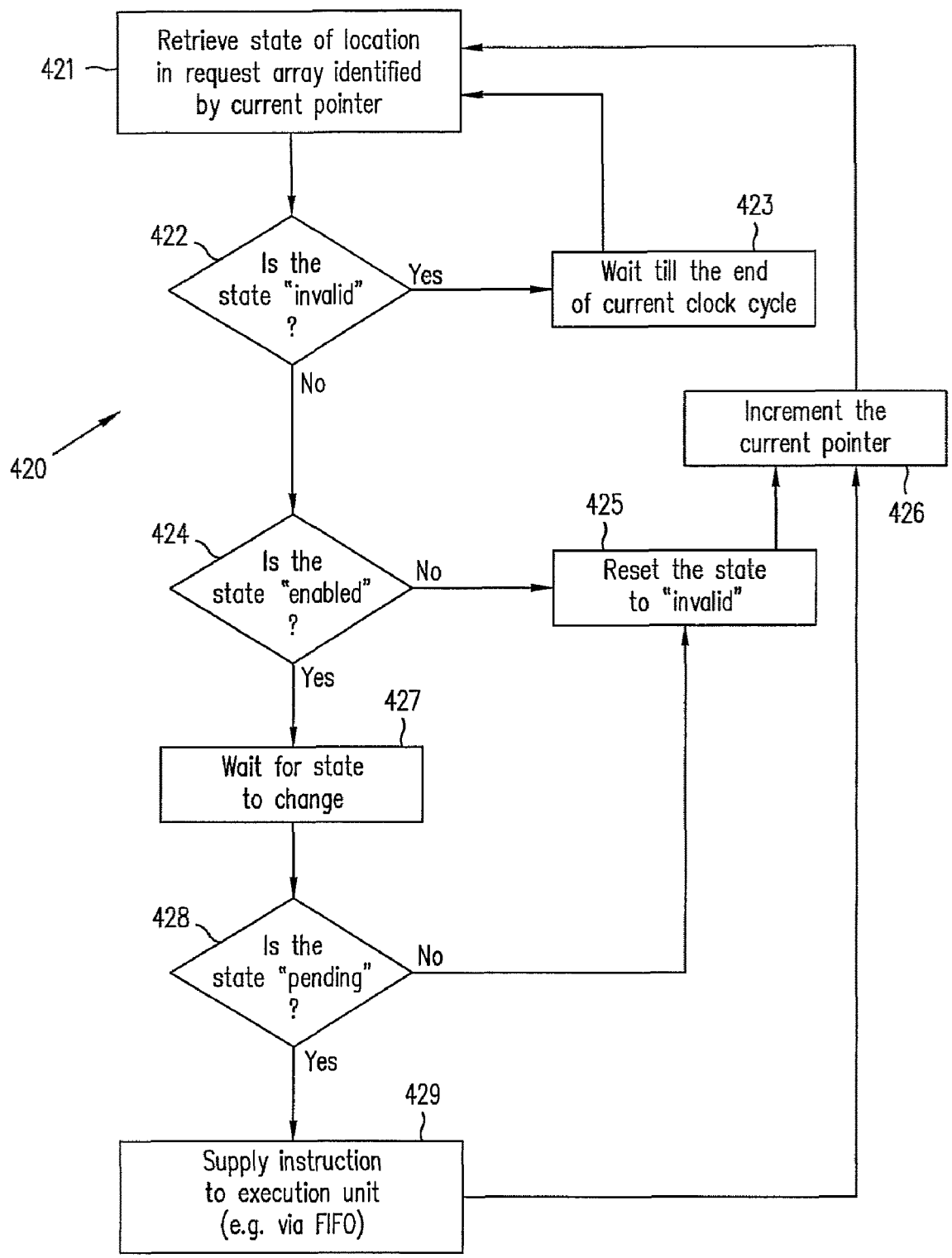

In one embodiment, the synchronizing sequencer is implemented by a number of processes that execute in parallel with one another. Specifically, one process 410 (illustrated in FIG. 4B) receives and handles all commands from the various tasks, while other processes 420 (illustrated in FIG. 4C) issue to an execution unit, instructions received from these tasks if so indicated by the state of each task. Therefore, in this embodiment, a single process 410 (FIG. 4B) handles all commands, for all synchronization points (i.e. for all request arrays).

Initially, process 410 simply waits for a command (as per act 411), and on receipt of a command from a task in a microcontroller, goes to act 412 to check if the command was a "declare" command. If so, process 410 goes to act 413 to copy enable/disable states for this task from the command into all request arrays (for all synchronization points), and thereafter returns to act 411.

If in act 412 the command received is not a declare command, then the command contains an instruction for changing the shared data (such as a store-and-load instruction or a store instruction). If so, process 410 goes to act 414 and changes a state value of a location in the request array corresponding to the task that generated the command (e.g. for a specific sequence number), for the current synchronization point from "enable" to "pending", and thereafter returns to act 411.

As noted above, a number of processes 420 (FIG. 4C) execute in the synchronizing sequencer, one for each request array. Specifically, the sequencer retrieves in act 421 the state of a location (in the request array) that is identified by the current pointer. If the retrieved state is "invalid" (see act 422), then the sequencer simply returns to act 421 (after the current clock cycle has completed). If the state is not "enabled" (see act 424), the sequencer simply resets the state to "invalid" (see act 425), and then increments the current pointer (see act 426), and returns to act 421.

If the state is "enabled" then the sequencer waits for the state to change (see act 427), and this may take several clock cycles, depending on the code path of a task (associated with the current location in the request array). When the state changes, the sequencer checks (in act 428) if the state is "pending" and if not, goes to act 425 (discussed above). If the state is "pending" then the sequencer supplies the instruction to the execution unit (see act 429), thereby to allow access to shared data.

FIG. 5A illustrates two arrays: (1) a two-dimensional array 501 (which is 4×4 in size in this example) that functions as a synchronization request array for a specific synchronization point (e.g. the first synchronization point S0) and (2) a one-dimensional array 502 (which is 1×4 in size in this example) that is used to navigate to the next location in array 501, as discussed below.

In FIG. 5A, array 501 has a row pointer Rptr pointing to the bottom-most row and a column pointer Cprt pointing to the left-most column, so that the two pointers together point to a first location in array 501, in column 0, row 0, which is labeled as "00". For example, based on certain number of high order bits of the sequence number, an entire row may be read in hardware, and the remaining low order bits of the sequence number are used to select one value from the row.

In one example illustrated in FIGS. 5A-5L, all possible sequence number values are mapped to one of the locations in array 501. For example, the sequence numbers may be mapped sequentially from left to right in the bottom row, followed by left to right in the row adjacent to the bottom row and so on (with the top right corner location of array 501 representing the largest possible sequence number).

In one example, a task that processes a packet with sequence number 0 does not expect to change the data (at the first synchronization point S0), and for this reason the "00" location in array 501 is initially set to value "0" which indicates "disabled" state (e.g. as a result of a "declare" command). The synchronizing sequencer resets the value in the first location "00" of array 501 to the value "x" which indicates "invalid" state, and moves the column pointer to point to the next column on the right (see FIG. 5B). Note that the row pointer remains the same until the column pointer reaches the right-most location of array 501.

The synchronizing sequencer notes that the second location "01" of array 501 is currently set to value "x" and therefore, a declare command has not yet been received (see FIG. 5C) from a task with sequence number 1, for the first synchronization point S0. At some time, a declare command from a task with sequence number 2 is received, and the value "1" received therefrom is loaded into array 501, in the location "02". Next, a declare command from a task with sequence number 5 is received (for the first synchronization point S0), and the value "1" received therefrom is loaded into array 501, in the location "11". Then, at a later time, a declare command from a task with sequence number 1 is received (for the first synchronization point S0), and the value "1" received therefrom is loaded into array 501, in the location "01", as shown in FIG. 5D.

Next, a "store-and-load" command is received for the first synchronization point S0, from a task with sequence number 2. So the synchronizing sequencer loads the value "2" into array 501 (see FIG. 5E), in the third location "02". Since it is not yet the turn of sequence number 2 (because the current pointer is still pointing to the second location "01" of array 501), the synchronizing sequencer simply places the received command in a buffer (called "out-of-sequence" buffer).

An out-of-sequence buffer which is used may be, for example, dedicated to holding instructions only for the first synchronization point S0 (so that there are multiple such buffers, one for each synchronization point), although a larger buffer to hold instructions for all synchronization points, may be used in other embodiments.

In view of this disclosure, the to-be-executed instructions being held in out-of-sequence buffers may be handled in a manner similar or identical to the prior art handling of "flows" of packets, with one flow for each synchronization point. Hence, each flow will have a task (and sequence number) that is identified by a current pointer.

Thereafter, at some point, a task with sequence number 1 issues a "store-and-load" command for the first synchronization point S0. The synchronization point for which a command has been issued is identified in the command, e.g. as the value of an operation number OPN (e.g. one of OP0-OP7 as per FIG. 6B). As a result of receiving a store-and-load command, the synchronizing sequencer loads the value "2" into array 501 (see FIG. 5F), in the second location "01".

Since the current pointer is also pointing to the second location "01", it is now the turn of the task with sequence number 1. Therefore, the synchronizing sequencer immediately passes an instruction in the just-received command for execution by an execution unit in the memory co-processor. For details on the memory co-processor, see the related U.S. patent application Ser. No. 10/117,779 concurrently filed herewith and incorporated by reference above.

After supplying the instruction to the execution unit, the synchronizing sequencer resets the value in the second location "01" of array 501 (see FIG. 5F) to the value "x" which indicates "invalid" state, and moves the column pointer to point to the next column on the right (see FIG. 5G), while the row pointer remains stationary.

At this point, the current pointer is pointing to a location "02" of array 501, with value "2" which means an instruction is pending (e.g. in the out-of-sequence buffer). The synchronizing sequencer sends this instruction for execution, and changes the value to "x" to indicate that this sequence number has been now processed for the first synchronization point S0.

At this point (FIG. 5H), the synchronizing sequencer notes that the next location has value "0" (meaning "disabled"), and changes this to value "x". Then synchronizing sequencer moves the current pointer up to the next row, to location "10" (which represents sequence no. 4). Since the values for location "10" is "0" (meaning "disabled"), the synchronizing sequencer changes this to value "x" and moves the pointer by one location to the right (not shown).

The location "11" (which represents sequence no. 5) has a value "2" which means an instruction is pending (e.g. in the out-of-sequence buffer), and the synchronizing sequencer supplies this instruction to the execution unit, changes this location to value "x" and moves the pointer by one location to the right (see FIG. 5I).

At this stage, the pointer is pointing to the location "12", which has a value "2" indicating that an instruction is pending (e.g. in the out-of-sequence buffer). Again, the synchronizing sequencer supplies this instruction to the execution unit, changes this location to value "x" and moves the pointer by one location to the right (not shown). The location "13" has value "0" thereby to indicate this sequence number is "disabled" and therefore the value is changed to "x" and the pointer is moved up the next row (see FIG. 5J).

In a similar manner, the upper-most row is eventually reached as illustrated in FIG. 5K, and the first two locations "30" and "31" are skipped because of the value "0" indicating that these sequence numbers are "disabled" and these values are changed to "x". The pointer now points to the location "32" which has a "pending" instruction which is thereafter executed, thereby to yield the array illustrated in FIG. 5L.

In the above-described manner, whenever the synchronizing sequencer receives a command from a task, it identifies and updates an appropriate array 501 associated with the specified synchronization point and sequence number. The synchronizing sequencer also (independently in one embodiment) evaluates the value at a location identified by the current pointer, and moves the current pointer if appropriate.

Some embodiments sequentially increment a row pointer until the right-most location of array 501 is reached.

However, in other embodiments combinational logic is used to determine the next state to be processed, hence skipping a number of disabled states. Also, in some embodiments, another array 502 (also called "navigation array") is used to identify the next row that has a location to be evaluated (e.g. all intermediate rows in which all locations are disabled are skipped).

Specifically, in one embodiment, an entire row of array 501 is read simultaneously (in hardware). Values in the row are simultaneously evaluated by combinational logic, and as a result of evaluation, the row may be updated (e.g. by changing the state to "invalid") if execution is to proceed to another row. Also as a result of evaluation navigation array 502 may be updated.

The evaluation result can have one of the following three values: value 0 if all locations in a row are "disabled" (in which case this row in array 501 will be completely skipped by the synchronizing sequencer when issuing instructions to the execution unit), value 1 if at least one location in the row is "pending" (in which case the synchronizing sequencer will read the row and possibly issue an instruction; issuance of an instruction can happen under the following two conditions (1) if no intermediate sequence number is "enabled" i.e. waiting to become "pending" or "invalid" and (2) if no intermediate sequence number is "invalid" i.e. waiting for state to become "enabled" or "disabled"), and value x if all locations in a row are not disabled and there is no instruction pending (in which case the synchronizing sequencer may not even read the row).

Therefore, in a single clock cycle, the synchronizing sequencer skips one or more rows that do not have relevant values. The synchronizing sequencer also avoids processing a row that doesn't have any pending instruction.

The number of locations in a row of array 501 is limited only by the number of values that can be evaluated in a single clock cycle, e.g. evaluating 32 values needs more time than evaluating 16 values (e.g. 8 nanoseconds may be required for 16 values to be evaluated). In one specific implementation, array 501 is 16×16 in size, with 2 bits of value per location.

Figure 6A:
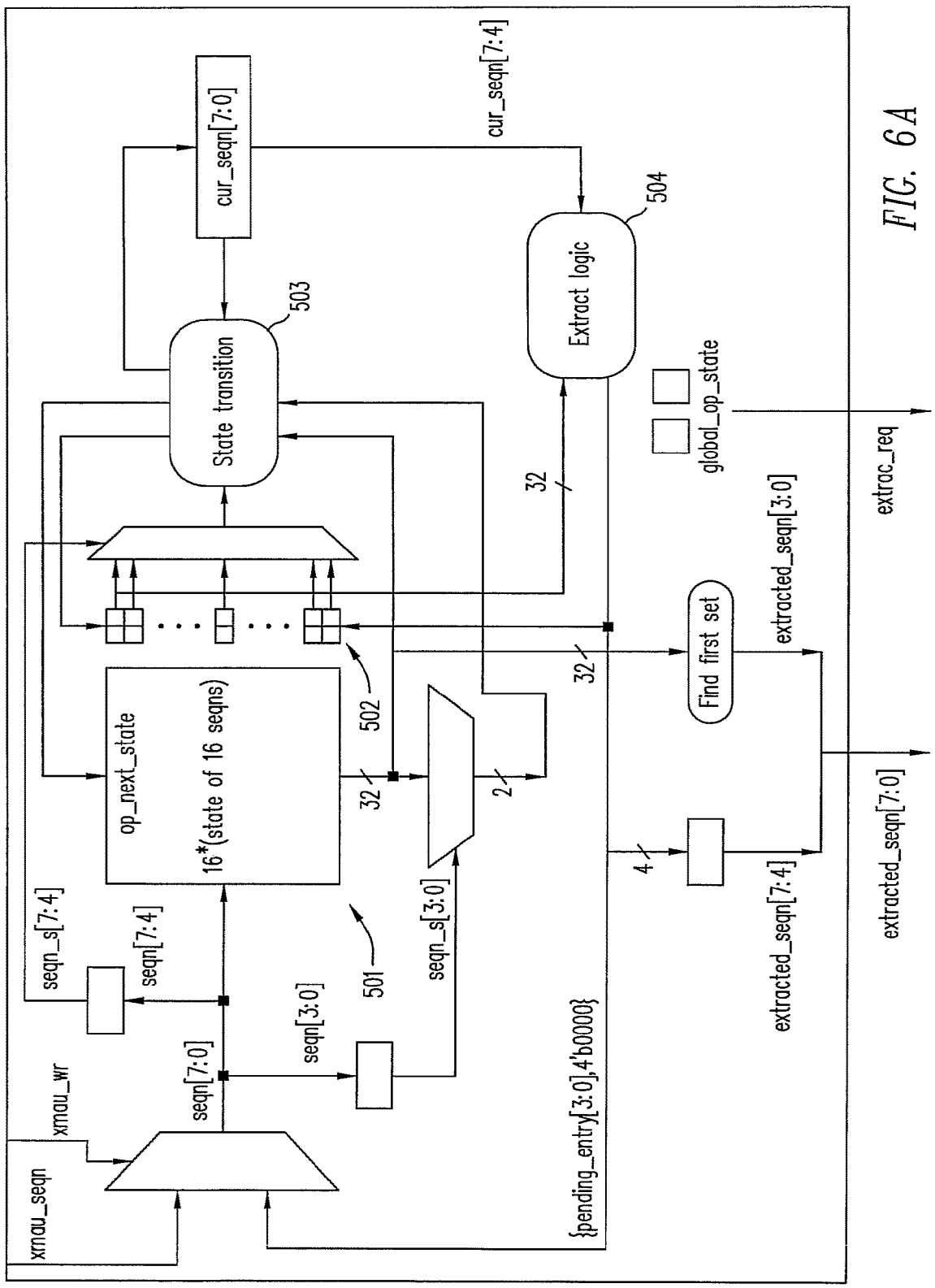
FIG. 6A illustrates, in a block diagram, circuitry for a single synchronization point used to identify a sequence number of an instruction to be executed in one embodiment.

FIG. 6A illustrates, in a block diagram, circuitry (also called "synchronizer element") for a single synchronization point used to extract a sequence number indicative of a pending instruction to be executed, from a request array 501, using a navigation array 502 (both arrays are illustrated in FIGS. 5A-5L). The synchronizer element of FIG. 6A also includes combinational circuitry 503 to implement state transitions, as described above in reference to, for example, FIG. 4A. The synchronizer element of FIG. 6A also includes circuitry 504 to perform the process described above in reference to, for example, FIG. 4C. Also illustrated in FIG. 6A are various combinational logic elements and storage elements to perform various acts of the type described in general herein and in detail in the attached Appendix A (filed electronically, but incorporated by reference herein in its entirety).

In one embodiment (see FIG. 6A), the sequencer maintains a table with a 2 bits of state per sequence number. These 2 bits indicate if the entry has a valid pending request to be issued to the execution unit or has an entry which could be skipped. The arrangement of this table is not in an array of 256*2 bits but in an array of 16 entries*16 consecutive states thus covering the 256 sequence numbers.

Figure 6B:
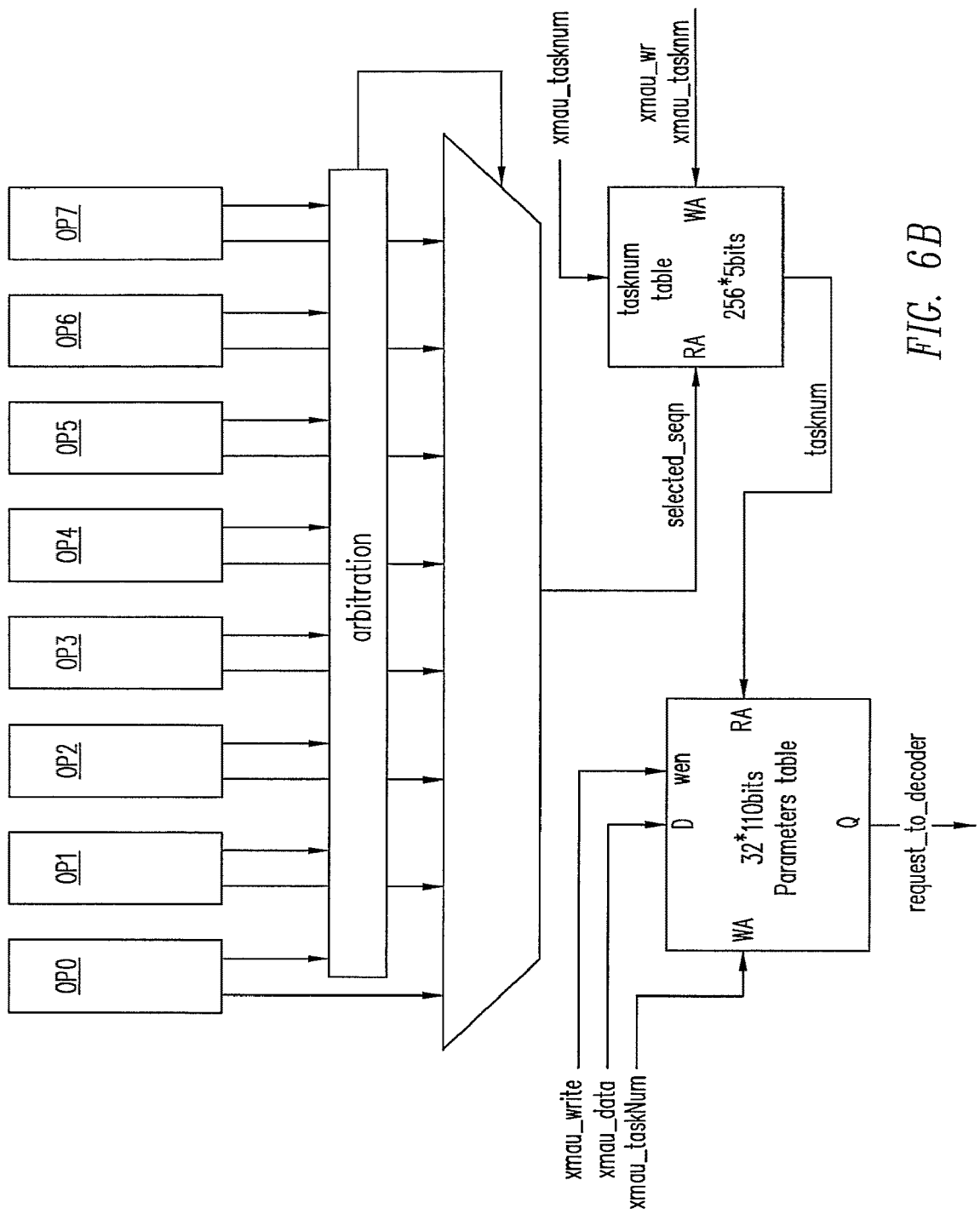
FIG. 6B illustrates, in a block diagram, replication of the circuitry of FIG. 6A to implement a number of synchronization points in accordance with the invention.

FIG. 6B illustrates, in a block diagram, replication of the synchronizer element of FIG. 6A in blocks op0-op7, to implement a number of synchronization points, and using arbitration (e.g. round-robin) to select one of the sequence numbers across all blocks, and use of that sequence number to pass to a decoder an instruction to be executed. In the implementation illustrated in FIG. 6B, all parameters for an instruction are stored in a parameters table that is indexed by a task number. The task number is supplied from a task number table that in turn is indexed by a sequence number. As noted above, each synchronizer element of FIG. 6A provides a sequence number, and one of these numbers is selected by arbitration. Although there may be a large number of values for a sequence number, the number of tasks is limited, and for this reason one level of indirection saves storage space in the parameters table (which holds, e.g. 32 entries, one entry for each task number).

Figure 6C:
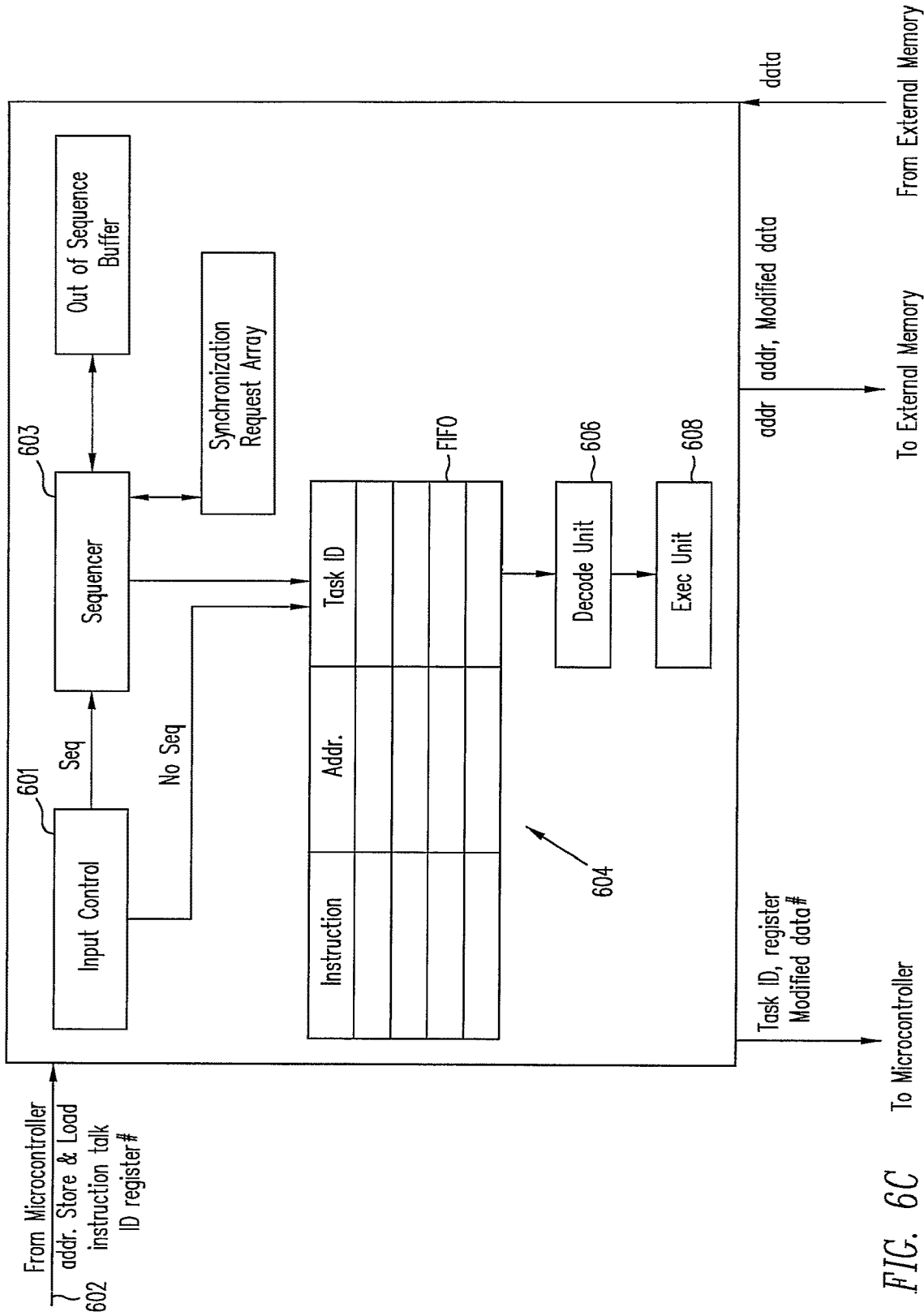
FIG. 6C illustrates, in a high-level block diagram, a memory co-processor of one embodiment, in which a sequencer of the type illustrated in FIGS. 6A and 6B is implemented.

FIG. 6C illustrates, in a high-level block diagram, a memory co-processor in which a sequencer of the type illustrated in FIGS. 6A and 6B is implemented. A memory co-processor illustrated in FIG. 6C also contains an input control block 601 that directs commands received on a bus 602 either to a sequencer 603 or to a command FIFO 604 that holds various instructions (along with a memory address and a task identifier) for decoding by decode unit 606 and execution by execution unit 608.

Such a decision is made based on the type of command received, e.g. if the command type is not "SPU" (which is an name for the memory co-processor of one embodiment), then the command is written directly to the FIFO. If the command type is "SPU" and if the "enable sequencing" signal (which is in a field in the command that has been received) is inactive then the command is written directly to the FIFO. In all other cases, the command is passed to the sequencer. As noted elsewhere herein, the sequencer buffers commands that are received out of sequence, and after the next command (based on a previously processed command's sequence number) is received, then as many commands as can be issued in sequence are issued to the command FIFO.

FIG. 6C also contains a decode unit 606 that decodes each instruction in the FIFO, and passes the decoded instruction and parameters to the execution unit 608. The execution unit in turn executes the instruction, e.g. performs a read-modify-write operation to read data from memory, change the data based on the specified modify function (such as policing) and writes the data back to memory.

Note that in some embodiments, there is one sequencer for eight ingress ports and another sequencer for eight egress ports. Moreover, in some embodiments, a cross-connect (called "XMAU") connects an execution unit of a microcontroller to a sequencer in a memory co-processor.

In one particular embodiment, there are two command FIFOs in the memory co-processor, for holding (1) commands transferred directly to the execution unit (e.g. simple load, store and crc store commands), and (2) commands that go through the sequencer first (so that the sequencer reorders these commands according to their sequence number).

In such an embodiment, a memory co-processor distinguishes between the two types of commands, because the commands that go through the sequencer usually need to use the alu stage of the execution unit pipe, and the alu stage is not available every cycle. The simple load and store commands can be inserted then, in order to avoid loss of cycles due to stalls.

The memory co-processor of one embodiment implements the Virtual Scheduling Algorithm of the ITU I.371 to perform policing of ATM cells. The memory co-processor uses an extention to this algorithm for variable length frames. Furthermore, in some embodiments, for ATM cells the memory co-processor performs the Virtual Scheduling Algorithm GCRA(I, L). For variable size frames the memory co-processor performs extended GCRA(I, L, S) algorithm (S stands for frame size in pre-defined units, e.g., 64 bytes). The memory co-processor returns a single bit to indicate conforming/non-conforming.

Numerous modifications and adaptations of the embodiments, examples, and implementations described herein will be apparent to the skilled artisan in view of the disclosure.

For example, under certain circumstances, no-need tasks may be allowed to change their decision, e.g. if a needy task that is to be granted access has not yet issued an access request. Moreover, instead of granting access to the shared data to tasks as per sequence number, a synchronizing logic of the type described herein may grant access in any order among the tasks, depending on the embodiment. For example, such a synchronizing logic may operate in a first-in-first-out manner by granting access first to a task that sends in its synchronization request first. Alternatively, the synchronizing logic may grant access to the shared data based on a priority associated with each task, or simply in a round-robin fashion.

Numerous such modifications and adaptations of the embodiments described herein are encompassed by the attached claims.

The invention claimed is:

1. A method of synchronizing a group of tasks in a microcontroller, the method comprising:

each task in the group of tasks in the microcontroller making an initial determination of one or more code paths that said each task is likely to follow;

each task, in the group of tasks in the microcontroller, declaring in a signal among a plurality of signals one of need or no need to access a shared resource expected at a synchronization point in said one or more code paths identified in the initial determination, prior to reaching the synchronization point;

receiving said signal from said each task in the group of tasks in the microcontroller;

granting access to the shared resource, based on the plurality of signals, to a second task in the group of tasks that declares in a second signal among the plurality of signals a need to access the shared resource if a first task in the group of tasks in the microcontroller has declared in a first signal among the plurality of signals no need to access the shared resource;

the first task executing without accessing the shared resource;

the second task accessing the shared resource only after said granting;

a third task in the group of tasks declares in a third signal in the plurality of signals, a need to access the shared resource; and subsequent to said declaring by the third task in the third signal and when the synchronization point is reached, further declaring by the third task in a fourth signal in the plurality of signals, no need to access the shared resource thereby to indicate a change in expectation on the access to the shared resource by the third task.

2. The method of claim 1 wherein:
said initial determination by the first task is made based on information in a header of a first unit of data received by the microcontroller; and
said initial determination by the second task is made based on information in a header of a second unit of data received by the microcontroller.

3. The method of claim 2 wherein:
the first unit of data comprises a packet.

4. The method of claim 2 wherein:
the first unit of data comprises a cell.

5. A method of synchronizing a group of tasks in a microcontroller, the method comprising:

each task, in the group of tasks in the microcontroller, declaring in a signal one of need or no need to access a shared resource expected at a synchronization point in a code path, prior to reaching the synchronization point;

receiving said signal from said each task in the group of tasks in the microcontroller;

granting access to the shared resource, based on a plurality of signals comprising said signal, to a second task in the group of tasks that declares a need to access the shared resource if a first task in the group of tasks has declared no need to access the shared resource;

the first task executing without accessing the shared resource;

the second task accessing the shared resource only after said granting;

a third task in the group of tasks declaring a need to access the shared resource;

subsequent to said declaring by the third task, further declaring by the third task of no need to access the shared resource thereby to indicate a change in expectation on the access to the shared resource by the third task;

wherein said further declaring is performed after reaching the synchronization point in the third task;

wherein said declaring by the third task of the need is comprised in one signal output by the microcontroller; and wherein said further declaring by the third task of no need is comprised in another signal output by the microcontroller.

6. The method of claim 5 wherein:
said declaring by the first task is made based at least partially on information in a header of a first unit of data received by the microcontroller; and
said declaring by the second task is made based at least partially on information in a header of a second unit of data received by the microcontroller.

7. The method of claim 6 wherein:
the first unit of data comprises a packet.

8. The method of claim 6 wherein:
the first unit of data comprises a cell.

9. The method of claim 5 wherein:
said declaring by the third task of the need is performed prior to reaching the synchronization point in the third task.

10. An apparatus comprising:

a microcontroller executing a group of tasks, each task in the group of tasks making an initial determination of one or more code paths that said each task is likely to follow, each task in the group declaring in a signal among a plurality of signals one of need or no need to access a shared resource expected at a synchronization point in said one or more code paths, based on the initial determination prior to reaching the synchronization point;

a co-processor coupled to the microcontroller, the co-processor receiving the plurality of signals from the microcontroller, the co-processor granting access to the shared resource, based on the plurality of signals, to a second task in the group of tasks that declares in a second signal a need to access the shared resource if a first task in the group of tasks has declared in a first signal no need to access the shared resource;

wherein the microcontroller executes said first task without accessing the shared resource and the microcontroller executes said second task by accessing the shared resource only after receiving a grant signal from the co-processor;

wherein within the microcontroller, a third task in the group of tasks declares in a third signal in the plurality of signals, a need to access the shared resource; and wherein within the microcontroller, subsequent to said declaring by the third task in the third signal and when the synchronization point is reached, further declaring by the third task in a fourth signal in the plurality of signals, no need to access the shared resource thereby to indicate a change in expectation on the access to the shared resource by the third task.

11. The apparatus of claim 10 wherein:
the initial determination in the first task is made based on information in a header of a first unit of data received by the microcontroller; and
the initial determination in the second task is made based on information in a header of a second unit of data received by the microcontroller.

12. The apparatus of claim 11 wherein:
the first unit of data comprises a packet.

13. The apparatus of claim 11 wherein:
the first unit of data comprises a cell.

14. Circuitry for synchronizing a group of tasks, said circuitry comprising:
means for each task in the group of tasks to make an initial determination of one or more code paths that said each task is likely to follow;
means for each task in the group of tasks to declare in a signal among a plurality of signals one of need or no need to access a shared resource expected at a synchronization point in said one or more code paths, based on the initial determination prior to reaching the synchronization point;
means for receiving the plurality of signals from the group of tasks;
means for granting access to the shared resource, based on the plurality of signals, to a second task in the group of tasks that declares in a second signal a need to access the shared resource if a first task in the group of tasks has declared in a first signal no need to access the shared resource;
means for said first task to execute without accessing the shared resource; and
means for said second task to access said shared resource only after receiving a grant signal from the means for granting;
means for a third task in the group of tasks to declare in a third signal in the plurality of signals, a need to access the shared resource; and
means for further declaring by the third task, subsequent to said third signal and when the synchronization point is reached, in a fourth signal in the plurality of signals, no need to access the shared resource thereby to indicate a change in expectation on the access to the shared resource by the third task.

15. The circuitry of claim 14 wherein:
the initial determination in the first task is made based on information in a header of a first unit of data received by the circuitry; and
the initial determination in the second task is made based on information in a header of a second unit of data received by the circuitry.

16. The circuitry of claim 15 wherein:
the first unit of data comprises a packet.

17. The circuitry of claim 15 wherein:
the first unit of data comprises a cell.

18. An apparatus comprising:
a microcontroller executing a group of tasks, each task in the group declaring in a signal one of need or no need to access a shared resource expected at a synchronization point in a code path, prior to reaching the synchronization point;
a co-processor coupled to the microcontroller, the co-processor receiving said signal from each task in the group of tasks in the microcontroller, the co-processor granting access to the shared resource, based on the plurality of signals, to a second task in the group of tasks that declares in a second signal a need to access the shared resource if a first task in the group of tasks has declared no need to access the shared resource;
wherein the microcontroller executes said first task without accessing the shared resource and the microcontroller executes said second task by accessing the shared resource only after receiving a grant signal from the co-processor;
wherein within the microcontroller, a third task in the group of tasks declares a need to access the shared resource; and
wherein within the microcontroller, subsequent to said declaring by the third task, further declaring by the third task of no need to access the shared resource thereby to indicate a change in expectation on the access to the shared resource by the third task;
wherein said further declaring is performed after reaching the synchronization point in the third task;
wherein said declaring by the third task of the need is comprised in one signal output by the microcontroller; and
wherein said further declaring by the third task of no need is comprised in another signal output by the microcontroller.

19. The apparatus of claim 18 wherein:
said declaring by the first task is made based at least partially on information in a header of a first unit of data received by the microcontroller; and
said declaring by the second task is made based at least partially on information in a header of a second unit of data received by the microcontroller.

20. The apparatus of claim 19 wherein:
the first unit of data comprises a packet.

21. The apparatus of claim 19 wherein:
the first unit of data comprises a cell.

22. The apparatus of claim 18 wherein:
said declaring by the third task of the need is performed prior to reaching the synchronization point in the third task.

23. Circuitry for synchronizing a group of tasks, said circuitry comprising:
means for each task, in the group of tasks, for declaring in a signal one of need or no need to access a shared resource expected at a synchronization point in a code path, prior to reaching the synchronization point;
means for receiving said signal from said each task in the group of tasks;
means for granting access to the shared resource, based on a plurality of signals comprising said signal, to a second task in the group of tasks that declares a need to access the shared resource if a first task in the group of tasks has declared no need to access the shared resource;
means for the first task executing without accessing the shared resource;
means for the second task accessing the shared resource only after said granting;
means for a third task in the group of tasks declaring a need to access the shared resource;
means for further declaring by the third task, subsequent to said declaring by the third task, of no need to access the shared resource thereby to indicate a change in expectation on the access to the shared resource by the third task;
wherein said further declaring is performed after reaching the synchronization point in the third task;
wherein said declaring by the third task of the need is comprised in one signal; and wherein said further declaring by the third task of no need is comprised in another signal.

24. The circuitry of claim 23 wherein:

said declaring by the first task is made based at least partially on information in a header of a first unit of data; and said declaring by the second task is made based at least partially on information in a header of a second unit of data.

25. The circuitry of claim 24 wherein:

the first unit of data comprises a packet.

26. The circuitry of claim 24 wherein:

the first unit of data comprises a cell.

27. The circuitry of claim 23 wherein:

said declaring by the third task of the need is performed prior to reaching the synchronization point in the third task.

\* \* \* \* \*